(12) United States Patent
Itakura et al.

(10) Patent No.: US 9,178,239 B2
(45) Date of Patent: Nov. 3, 2015

(54) PROTON CONDUCTOR, METHOD FOR MANUFACTURING PROTON CONDUCTOR, AND FUEL CELL

(71) Applicants: DENSO CORPORATION, Aichi-pref. (JP); Kyoto University, Kyoto-shi, Kyoto-fu (JP)

(72) Inventors: Tomoya Itakura, Nagoya (JP); Miho Ito, Toyokawa (JP); Susumu Kitagawa, Kyoto (JP); Satoshi Horike, Kyoto (JP); Daiki Umeyama, Kyoto (JP); Munehiro Inukai, Kyoto (JP)

(73) Assignees: DENSO CORPORATION, Kariya, Aichi-pref. (JP); KYOTO UNIVERSITY, Sakyo-Ku, Kyoto-shi, Kyoto-pref. (JP)

( * ) Notice: Subject to any disclaimer, the term of this patent is extended or adjusted under 35 U.S.C. 154(b) by 336 days.

(21) Appl. No.: 13/860,658

(22) Filed: Apr. 11, 2013

(65) Prior Publication Data

US 2014/0011103 A1    Jan. 9, 2014

(30) Foreign Application Priority Data

Apr. 16, 2012 (JP) .................. 2012-093175
Nov. 14, 2012 (JP) .................. 2012-250557
Feb. 28, 2013 (JP) .................. 2013-039574

(51) Int. Cl.
    *H01M 8/10*  (2006.01)
(52) U.S. Cl.
    CPC ............ *H01M 8/1067* (2013.01); *H01M 8/103* (2013.01); *H01M 8/1051* (2013.01); *Y02E 60/521* (2013.01)
(58) Field of Classification Search
    CPC ...................................... H01M 8/10
    USPC ............................ 429/492, 408, 33; 521/27
    See application file for complete search history.

(56) References Cited

U.S. PATENT DOCUMENTS

| | | | |
|---|---|---|---|
| 2004/0151983 A1 | 8/2004 | Kasuga | |
| 2005/0084727 A1* | 4/2005 | Kiefer et al. | 429/33 |
| 2006/0159974 A1* | 7/2006 | Li et al. | 429/33 |

FOREIGN PATENT DOCUMENTS

| | | |
|---|---|---|
| JP | 2001-167929 | 6/2001 |
| JP | 2002-097272 | 4/2002 |
| JP | 2003-217339 | 7/2003 |
| JP | 2005-158646 | 6/2005 |
| JP | 2009-295539 | 12/2009 |

OTHER PUBLICATIONS

"Phase Controlled Fast Proton Conducting 1D Coordination Polymer At Anhydrous Room Temperature", Japan Society Coordination Chemistry $62^{nd}$ JSCC Symposium Proceedings, Published Sep. 1, 2012.

* cited by examiner

Primary Examiner — Patrick Ryan
Assistant Examiner — Wyatt McConnell
(74) Attorney, Agent, or Firm — Harness, Dickey & Pierce, P.L.C.

(57) ABSTRACT

A proton conductor includes a metal ion, an oxoanion, and a molecule capable of undergoing protonation or deprotonation, in which at least one of the oxoanion and the molecule capable of undergoing protonation or deprotonation coordinates to the metal ion to form a coordination polymer. The oxoanion is preferably a monomer. The oxoanion is exemplified by at least one selected from the group consisting of phosphate ion, hydrogenphosphate ion, and dihydrogenphosphate ion. The molecule capable of undergoing protonation or deprotonation is exemplified by at least one selected from the group consisting of imidazole, triazole, benzimidazole, benzotriazole, and derivatives thereof.

14 Claims, 9 Drawing Sheets

PAA

PVPA

PSSA

B: NUCLEOBASE
DNA

PROTON CONDUCTOR, METHOD FOR MANUFACTURING PROTON CONDUCTOR, AND FUEL CELL

CROSS REFERENCE TO RELATED APPLICATION

The present application is based on Japanese Patent Applications No. 2012-93175 filed on Apr. 16, 2012, No. 2012-250557 filed on Nov. 14, 2012, and No. 2013-39574 filed on Feb. 28, 2013, the disclosure of which is incorporated herein by reference.

TECHNICAL FIELD

The present disclosure relates to a proton conductor, a method for manufacturing the proton conductor, and a fuel cell using the proton conductor.

BACKGROUND ART

Patent Literature 1: JP-2002-097272 A
Patent Literature 2: JP-2003-217339 A (US 2004/0151983 A)

Proton-exchange membrane fuel cell systems are desirably simplified and prepared at lower cost. This demands electrolyte materials that operate at an operating temperature of 100° C. or higher in an atmosphere with no or little humidification. In contrast, customary proton-exchange membrane fuel cells each include an electrolyte that performs ionic conduction by water as proton carrier. The electrolyte is represented by perfluorinated sulfonic acid polymers. The customary proton-exchange membrane fuel cells thereby fail to exhibit satisfactory ionic conduction under operation conditions at a temperature of 100° C. or higher with no or little humidification.

Sol-gel porous glass (Patent Literature 1) and a phosphate hydrogel (Patent Literature 2) have been known as electrolyte materials that less suffer from evaporation of water even at high temperatures.

The techniques disclosed in Patent Literatures 1 and 2 require humidification up approximately to saturated water vapor pressure so as to suppress water evaporation. The techniques are therefore still insufficient in ionic conductivity and stability under conditions with little humidification. The customary electrolyte materials fail to have satisfactory ionic conductivity and stability under operation conditions at a high temperature of 100° C. or higher with no or little humidification.

SUMMARY

It is an object of the present disclosure to provide a proton conductor that is usable even at evaluated temperatures of 100° C. or higher without humidification. Another object of the present disclosure is to provide a method for manufacturing the proton conductor; and to provide a fuel cell using the proton conductor.

According to an aspect of the present disclosure, a proton conductor is provided to include a metal ion, an oxoanion, and a molecule capable of undergoing protonation or deprotonation, in which the oxoanion and/or the molecule capable of undergoing protonation or deprotonation coordinates to the metal ion to form a coordination polymer.

The oxoanion, when serving as a monomer and coordinating to the metal ion, helps the proton conductor to hold protons in a high concentration. The molecule capable of undergoing protonation or deprotonation coordinates to the metal or interacts with the oxoanion through hydrogen bonding or coulomb coupling. The molecule capable of undergoing protonation or deprotonation thereby remains in the structure without evaporation even at 100° C. or higher.

The proton conductor according to the above aspect exhibits high ionic conductivity even at high temperatures typically of 100° C. or higher. When the proton conductor is employed as an electrolyte to form a fuel cell, the fuel cell is usable even at high temperatures.

The proton conductor performs ionic conduction without the medium of water. This allows the fuel cell to be usable under conditions with no or little humidification. This in turn eliminates the need of a system for controlling water (moisture) content in the electrolyte.

In addition, the proton conductor performs ionic conduction without the medium of a liquid (including another liquid than water). This protects the fuel cell from disadvantages. The disadvantages are such that: the liquid leaches out; the leached liquid reacts with a component in the electrode to impair the fuel cell and induce a mixed potential; and the reaction reduces the performance of the fuel cell.

BRIEF DESCRIPTION. OF DRAWINGS

The above and other objects, features, and advantages of the present disclosure will become more apparent from the following detailed description made with reference to the accompanying drawings. In the drawings.

Figure 7:
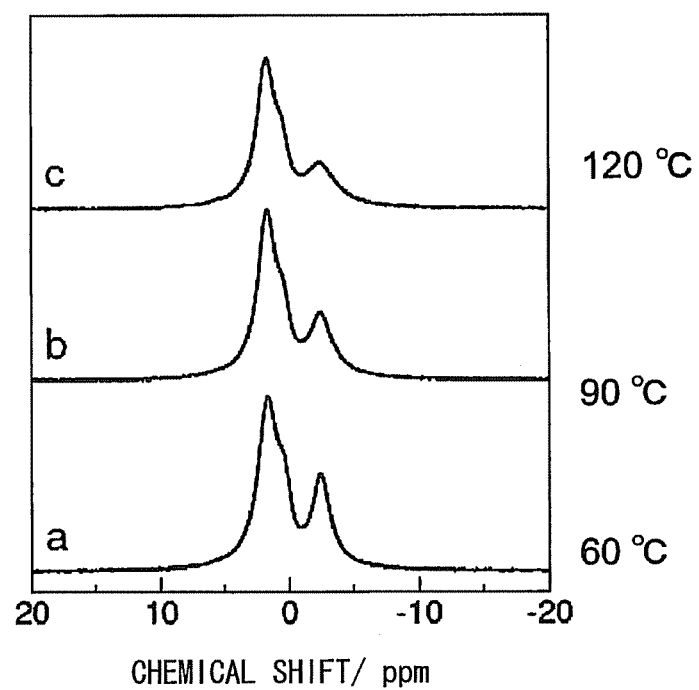
Figure 8:
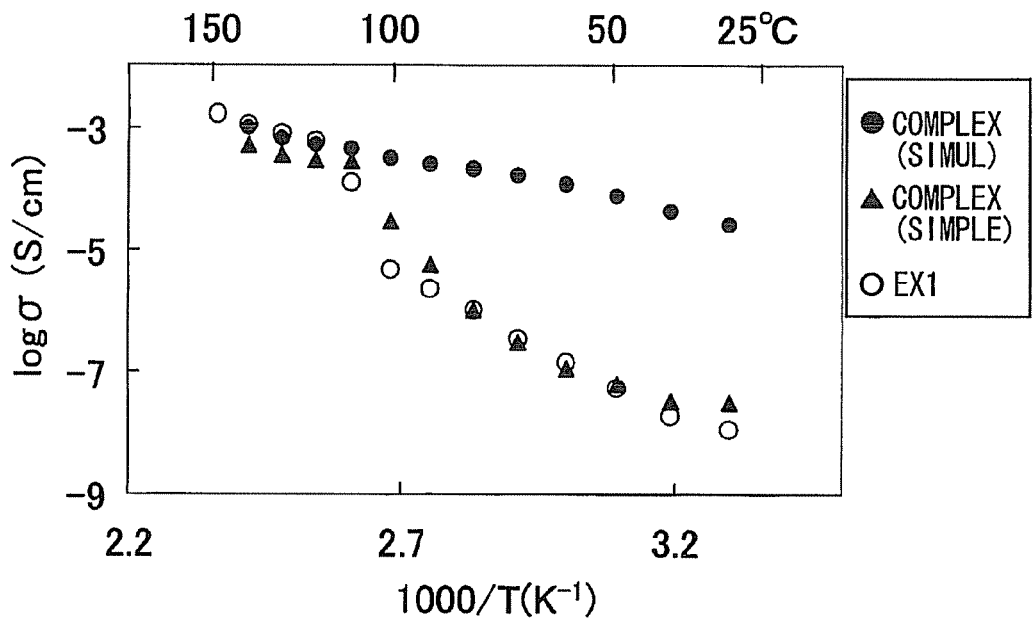
Figure 9:
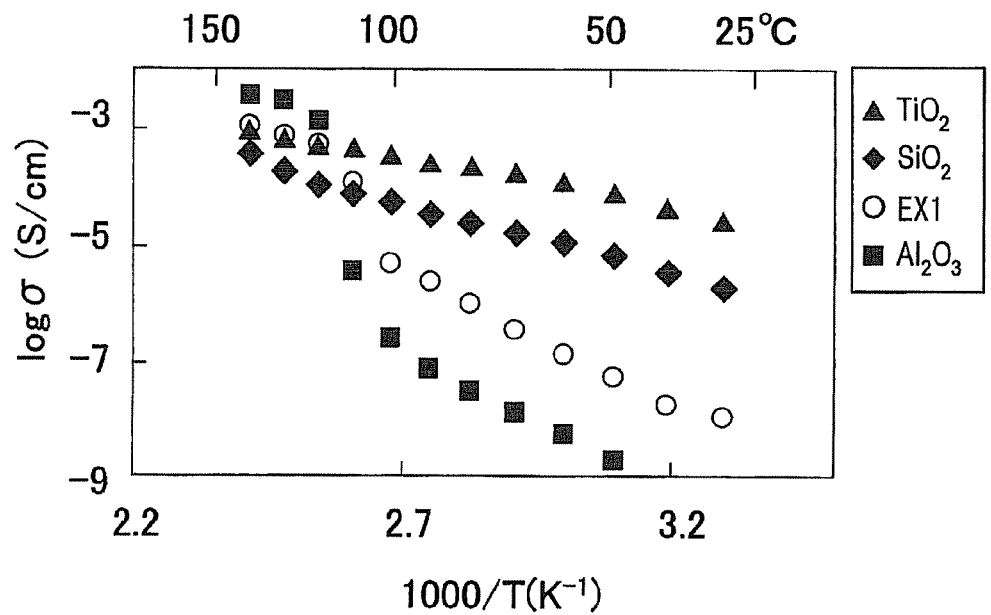
Figure 10:
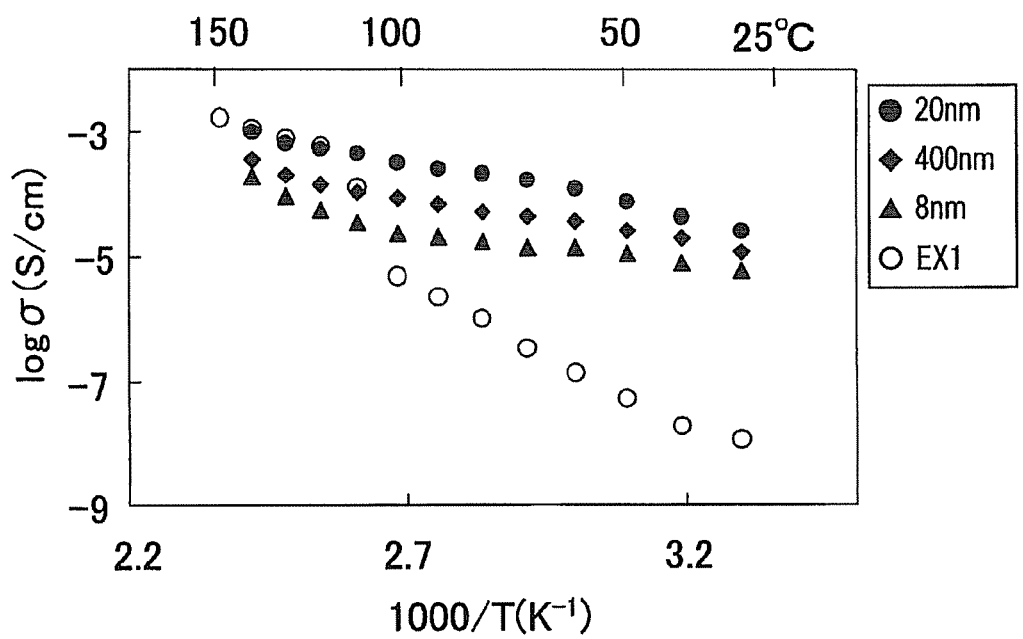
Figure 11:
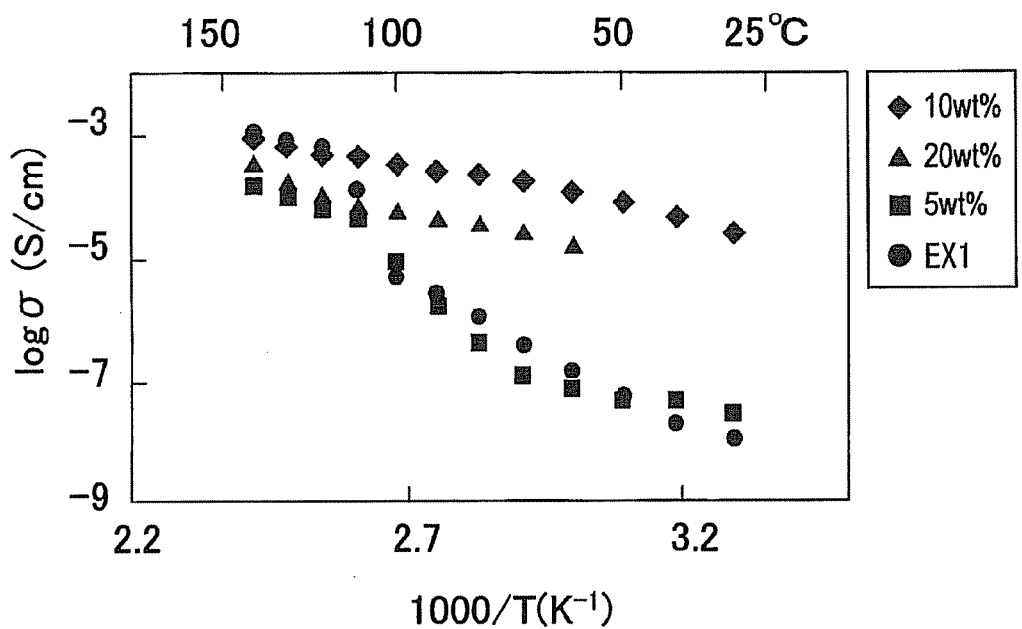
Figure 12:
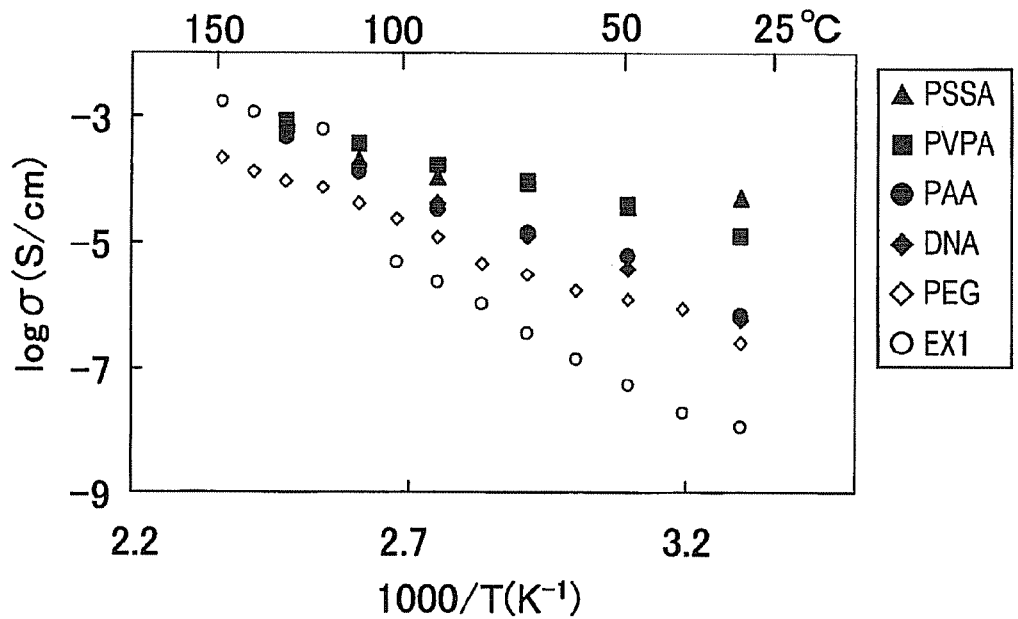
Figure 13:
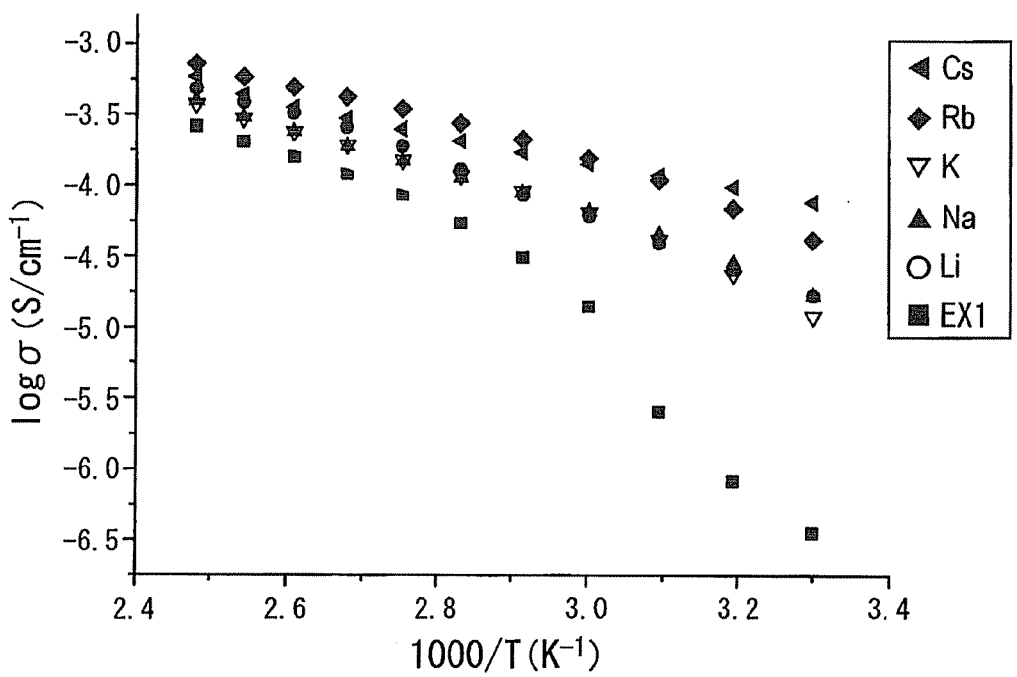
Figure 14:
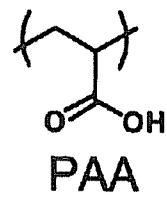
Figure 14:
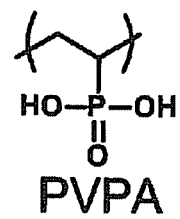
Figure 14:
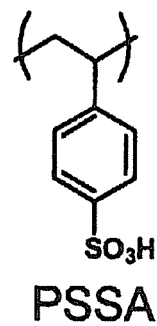
Figure 14:
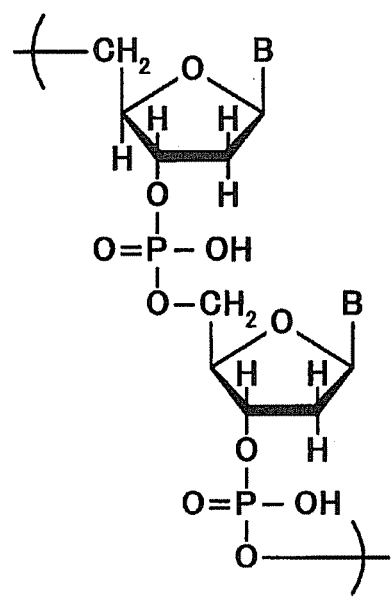

FIG. 7 a diagram depicting a $^{31}$P-MAS-NMR chart of Example 1;

FIG. 8 is a diagram illustrating measured ionic conductivities of Examples 1 and 18, and Referential Example;

FIG. 9 is a diagram illustrating measured ionic conductivities of Examples 1 and 18 to 20;

FIG. 10 is a diagram illustrating measured ionic conductivities of Examples 1, 18, 21, and 22;

FIG. 11 is a diagram illustrating measured ionic conductivities of Examples 1, 18, 23, and 24;

FIG. 12 is a diagram illustrating measured ionic conductivities of Examples 1 and 25 to 29;

FIG. 13 is a diagram illustrating measured ionic conductivities of Examples 1 and 30 to 34; and FIG. 14 is an explanatory diagram illustrating exemplary organic polymers to be added as an additive.

DETAILED DESCRIPTION

An embodiment of the present disclosure will be explained. The oxoanion for use herein is exemplified by phosphate ion and sulfate ion. Among them, phosphate ion is preferred for satisfactory chemical stability to hydrogen. The phosphate ion may also be in the form of hydrogenphosphate ion to which one proton coordinates, or in the form of dihydrogenphosphate ion to which two protons coordinate. In a preferred embodiment, the oxoanion is present as a monomer without condensation and coordinates to the metal ion. This allows the proton conductor to hold protons in a high concentration and to exhibit satisfactory stability to water.

The molecule capable of undergoing protonation or deprotonation for use herein is a molecule having a coordination site in a number of preferably two or more per molecule. Further, the molecule capable of undergoing protonation or deprotonation may be also simply referred to as a proton-coordinating molecule. The coordination site serves to coordinate to a proton. The molecule capable of undergoing protonation or deprotonation is preferably selected from imidazole, triazole, benzimidazole, benzotriazole, and derivatives of them. These are preferred for satisfactory ionic conductivity because of having a coordination site or sites with good balance between coordination and release of proton. As used herein the term "derivative" refers to a compound corresponding to an original compound, except for replacing part of the chemical structure of the original compound with another atom or atomic group. Exemplary derivatives for imidazole include 2-methylimidazole, 2-ethylimidazole, histamine, and histidine.

The molecule capable of undergoing protonation or deprotonation is exemplified by: primary amines represented by General Formula R—$NH_2$; secondary amines represented by General Formula $R^1(R^2)$—NH; and tertiary amines represented by General Formula $R^1(R^2)(R^3)$—N. In these formulae, R, $R^1$, $R^2$, and $R^3$ are each independently any of alkyl groups, aryl groups, alicyclic hydrocarbon groups, and heterocyclic groups.

The primary amines are exemplified by: (lower alkyl) amines such as methylamine, ethylamine, and propylamine; and aromatic amines such as aniline and toluidine.

The secondary amines are exemplified by: di-(lower alkyl) amines such as dimethylamine, diethylamine, and dipropylamine; and aromatic secondary amines such as N-methylaniline and N-methyltoluidine.

The tertiary amines are exemplified by tri-(lower alkyl) amines such as trimethylamine and triethylamine. Exemplary molecule capable of undergoing protonation or deprotonations further include linearly-catenated carbon diamines, which include: ethylenediamine; and N-(lower alkyl)derivatives thereof, such as tetramethylethylenediamine.

The molecule capable of undergoing protonation or deprotonation is further exemplified by saturated cyclic amines such as pyrrolidine, N-(lower alkyl)pyrrolidines (e.g., N-methylpyrrolidine), piperidine, N-(lower alkyl)piperidines (e.g., N-methylpiperidine), morpholine, and N-(lower alkyl)morpholines (e.g., N-methylmorpholine).

The molecule capable of undergoing protonation or deprotonation is still further exemplified by saturated cyclic diamines such as piperazine, N-di-(lower alkyl)piperazines (e.g., N,N-dimethylpiperazine), and 1,4-diazabicyclo[2.2.2] octane (also known as triethylenediamine).

The metal ion is preferably exemplified by, but not limited to, heavier transition metal ions and main-group metal ions. These metal ions are preferred because they can easily form a coordinate bond with the oxoanion and/or molecule capable of undergoing protonation or deprotonation. Among them, preferred are cobalt ion, copper ion, zinc ion, and gallium ion.

The proton conductor includes a metal ion, an oxoanion, and a molecule capable of undergoing protonation or deprotonation. The proton conductor preferably includes 1 to 4 moles of the oxoanion and 1 to 3 moles of the molecule capable of undergoing protonation or deprotonation per 1 mole of the metal ion. These compositional ratios are preferred for allowing these components to form a coordination polymer efficiently. The proton conductor, if including the oxoanion and/or the molecule capable of undergoing protonation or deprotonation in a compositional ratio of less than 1 mole, may fail to form a coordination polymer. The proton, conductor, if including more than 4 moles of the oxoanion or more than 3 moles of the molecule capable of undergoing protonation or deprotonation, may fail to be solid; further, this proton conductor may absorb moisture in an extremely high amount and suffer from significantly low shape stability.

The proton conductor may be prepared by mixing/stirring a metal oxide as a metal ion source with an oxoacid and a molecule capable of undergoing protonation or deprotonation. The mixing/stirring process may employ a solvent that can dissolve or uniformly disperse the materials. The mixing/stirring process, however, is preferably performed by a solvent-free reaction for lower production cost. A heat treatment of the proton conductor in the production process, if performed at a temperature of higher than 200° C., may cause condensation of the phosphate ion that is contained. To avoid this, the heat treatment is preferably performed at a temperature of 200° C. or lower.

The proton conductor may further include an additive in addition to the metal ion, oxoanion, and molecule capable of undergoing protonation or deprotonation. The additive may be at least one selected from the group consisting of a metal oxide, an organic polymer, and an alkali metal ion. Such additive helps the proton conductor to have further higher ionic conductivity at a low temperature (e.g., lower than 100° C.) without deterioration in performance at a high temperature (e.g., 100° C. or higher).

The additive is preferably added in an amount of 1 to 20 parts by weight per 100 parts by weight of the total weight of the metal ion, oxoanion, and molecule capable of undergoing protonation or deprotonation. When being a metal oxide or organic polymer, the additive is preferably added in an amount of 5 to 20 parts by weight. The additive, when added in an amount within this range, helps the proton conductor to have further higher ionic conductivity at a low temperature (e.g., lower than 100° C.) without deterioration in performance at a high temperature (e.g., 100° C. or higher).

The metal oxide is exemplified by at least one selected from the group consisting of $SiO_2$, $TiO_2$, $Al_2O_3$, $WO_3$, $MoO_3$, $ZrO_2$, and $V_2O_5$. A metal oxide of this type helps the proton conductor to have further higher ionic conductivity at a low temperature (e.g., lower than 100° C.) without deterioration in performance at a high temperature (e.g., 100° C. or higher). The metal oxide preferably has a particle size of 5 to 500 nm. The metal oxide, when having a particle size within this range, helps the proton conductor to have further higher ionic conductivity at a low temperature (e.g., lower than 100° C.) without deterioration in performance at a high temperature (e.g., 100° C. or higher). As used herein the term "particle size" refers to a value obtained by taking an image of a metal oxide particle with a scanning electron microscope (SEM) and analyzing the image.

The organic polymer preferably has' an acidic functional group. Such organic polymer having an acidic functional group helps the proton conductor to have further higher ionic conductivity at a low temperature (e.g., lower than 100° C.) without deterioration in performance at a high temperature (e.g., 100° C. or higher). The acidic functional group is exemplified by carboxyl group (—COOH), sulfonic acid group (—$SO_3H$), and phosphonic acid group (—$PO_3H_2$). The organic polymer preferably has a pH of 4 or less. The organic polymer, when having a pH within this range, helps the proton conductor to have further higher ionic conductivity at a low temperature (e.g., lower than 100° C.) without deterioration in performance at a high temperature (e.g., 100° C. or higher).

The organic polymer is exemplified by a poly(acrylic acid) (PAA), a poly(vinylphosphonic acid) (PVPA), a poly(styrenesulfonic acid) (PSSA), and a deoxyribonucleic acid (DNA), as illustrated in FIG. 14.

The alkali metal ion is exemplified by at least one metal ion selected from the group consisting of Li, Na, K, Rb, and Cs ions. These alkali metal ions helps the proton conductor to have further higher ionic conductivity both at a low temperature (e.g., lower than 100° C.) and a high temperature (e.g., 100° C. or higher).

The proton conductor, when containing an additive, may be prepared by mixing/stirring the metal oxide as a metal ion source with an oxoacid, the molecule capable of undergoing protonation or deprotonation, and the additive. In this process, all the materials are preferably mixed and stirred simultaneously.

The mixing/stirring process may employ a solvent that can dissolve or uniformly disperse the materials. The process, however, is preferably performed by a solvent-free reaction for lower production cost. A heat treatment of the proton conductor in the production process, if performed at a temperature of higher than 200° C., may cause condensation of the phosphate ion to be contained. To avoid this, the heat treatment is preferably performed at a temperature of 200° C. or lower.

A fuel cell according to an embodiment of the present embodiment employs the proton conductor as an electrolyte.

EXAMPLE 1

In a mortar were weighed 210 mg of zinc oxide, 530 µL of a 85% phosphoric acid aqueous solution, and 350 mg of imidazole, followed by mixing and stirring at room temperature in the atmosphere for 15 minutes. The mixture was dried at 80° C. for 15 hours and yielded a white powder (proton conductor).

Figure 3:
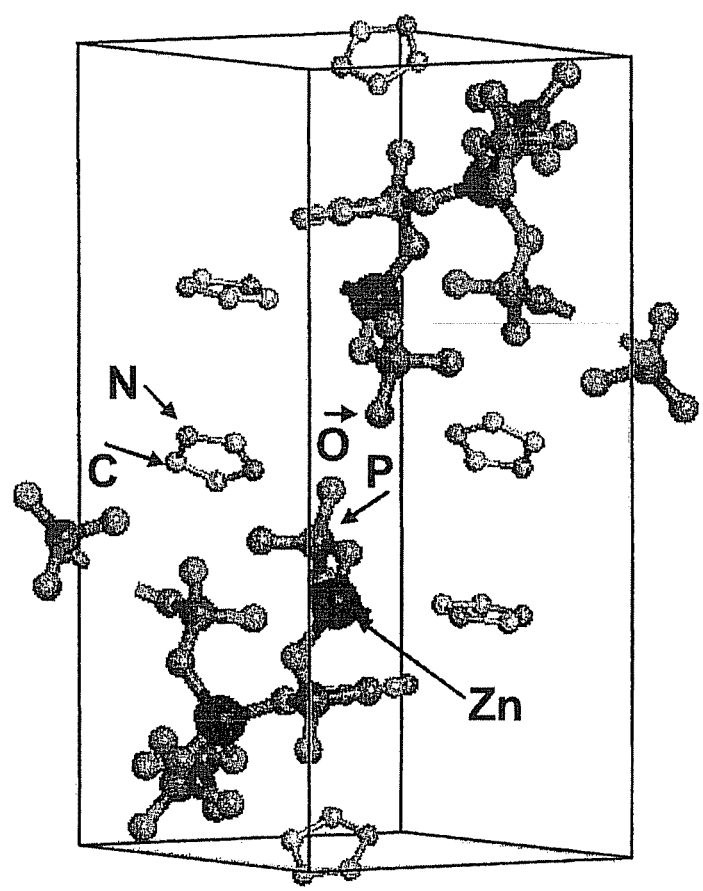
FIG. 3 is an explanatory diagram illustrating crystal structure obtained by single-crystal X-ray diffraction of Example 1 according to the embodiment of the present disclosure.

The powder was subjected to X-ray crystallography. Data from the X-ray crystallography demonstrate that the powder had a crystal structure as follows. Phosphate ions coordinate to zinc ion to form a one-dimensional coordination polymer. Imidazole forms hydrogen bonding with the coordination polymer through the phosphate ion of the coordination polymer and a proton. FIG. 3 illustrates the data from X-ray crystallography. The powder was further subjected to $^{31}$P-MAS-NMR measurement to find that the powder included no phosphoric acid condensate.

Figure 1:
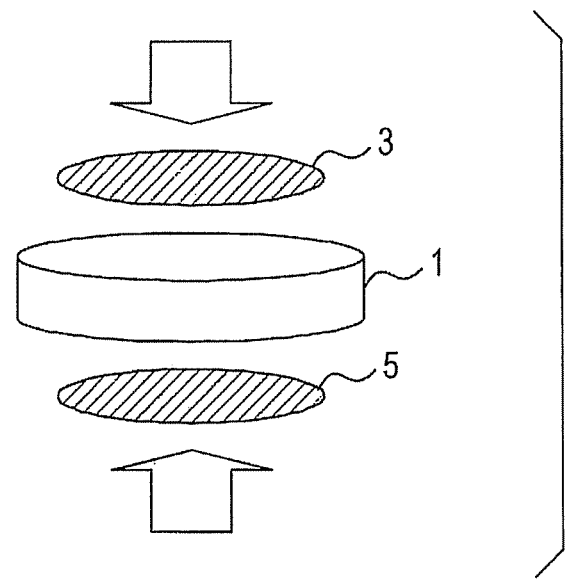
FIG. 1 is an explanatory drawing illustrating a manufacturing method of a single cell of a fuel cell according to an embodiment of the present disclosure.
Figure 2:
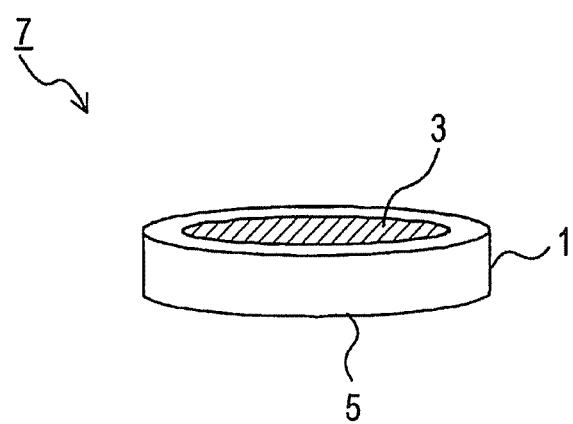
FIG. 2 is a perspective view illustrating a structure of a single cell of a fuel cell according to the embodiment of the present disclosure.

The prepared proton conductor was formed into a cylinder having a diameter of 10 mm as illustrated in FIG. 1 to give an electrolyte 1. A pair of disc-like platinum-supporting carbon electrodes 3 and 5 was compression-bonded to both sides of the electrolyte 1 at a load of 2000 Kg and yielded a single cell 7 as illustrated in FIG. 2. The carbon electrodes each had a diameter of 9 mm. The single cell 7 will constitute a fuel cell.

The prepared single cell 7 was subjected to alternating-current impedance measurement to determine its ionic conductivity. The measurement was performed in a nitrogen gas stream at frequencies from 0.1 Hz to 1 MHz and a voltage magnitude of 10 mV. The measurement revealed that the single cell 7 had an ionic conductivity of 1.6 ms/cm and 2 mS/cm at 150° C. and 160° C., respectively.

Next, hydrogen gas and air (gaseous air) were supplied to the respective electrodes of the single cell 7 each at a flow rate of 100 mL per minute to constitute a fuel cell. An open-circuit voltage of the fuel cell was measured at 150° C. and found to be 0.90 V.

The proton conductor was subjected to powder X-ray diffractometry to measure its lattice parameter. The powder X-ray diffractometry was performed under conditions as follows.

X-ray source: Cu Kα radiation
Measurement range: 5°≤2θ≤40°
Step size: 0.04°

The ionic conductivity and lattice parameter measured in Example 1 are indicated in Table 1 described later.

EXAMPLES 2 to 17

Figure 4:
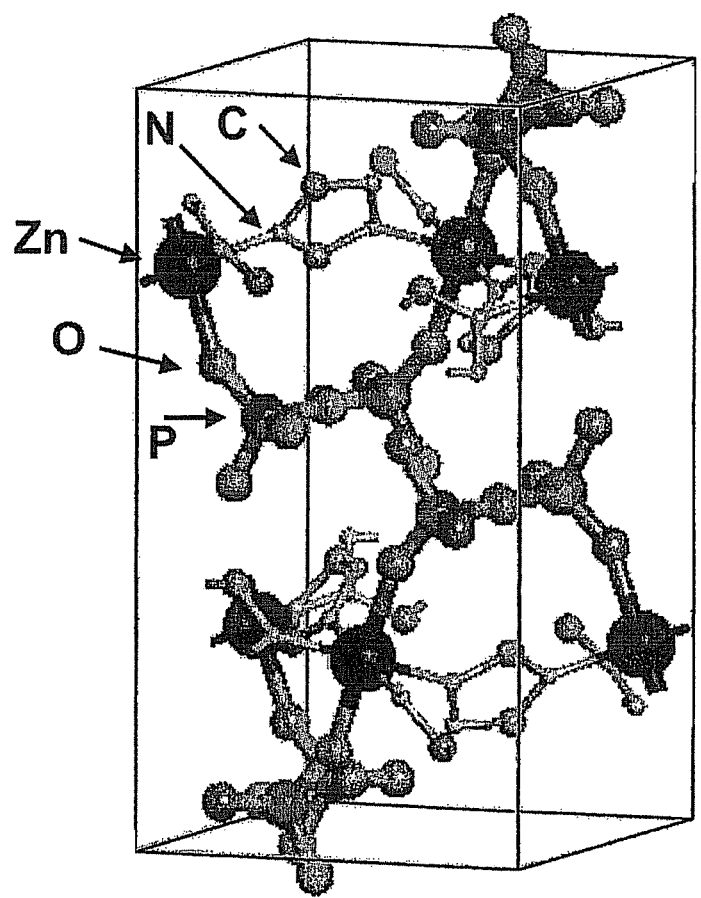
FIG. 4 is an explanatory diagram illustrating crystal structure obtained by single-crystal X-ray diffraction of Example 10.
Figure 5:
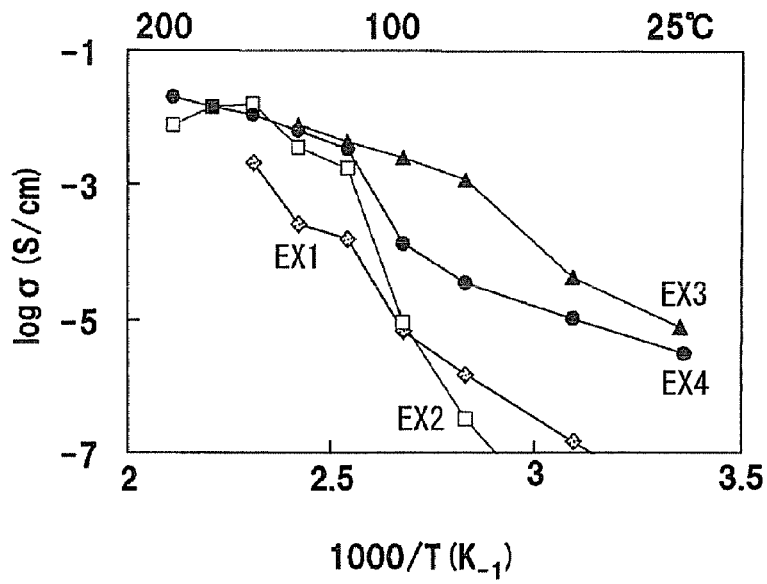
FIG. 5 is a diagram illustrating measured ionic conductivities of Examples 1, 2, 3, and 4.
Figure 6:
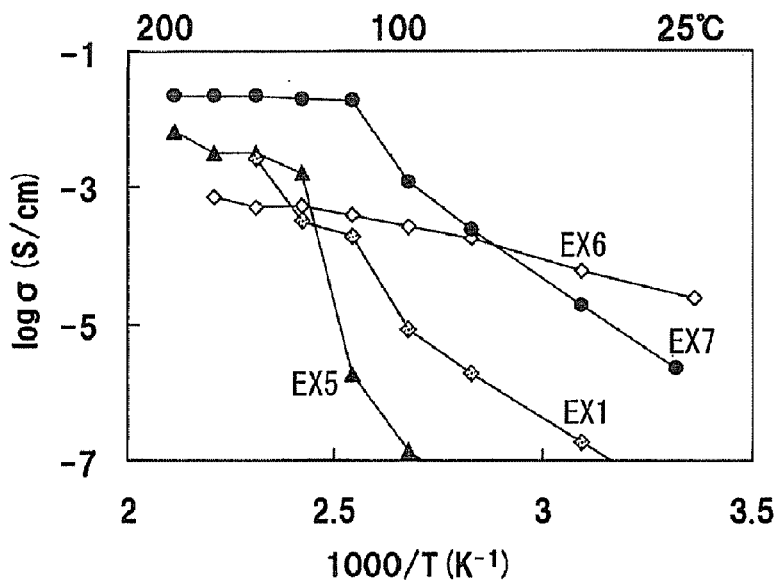
FIG. 6 is a diagram illustrating measured ionic conductivities of Examples 1, 5, 6, and 7.

Proton conductors and single cells as in Table 2 were prepared by the procedure of Example 1, except for varying the types of metal ion and molecule capable of undergoing protonation or deprotonation, and the compositional ratio of materials. These were subjected to X-ray crystallography and measurements of ionic conductivity and lattice parameter. Measured ionic conductivity and lattice parameter are indicated in Table 1. Ionic conductivities in Table 1 are values as measured at temperatures (in "Measurement temperature") given in Table 1. FIGS. 5 and 6 illustrate ionic conductivities of some proton conductor samples. FIG. 4 illustrates data obtained from X-ray crystallography of Example 6.

TABLE 1

|  | Ionic conductivity | Measurement temperature | Lattice parameter (a, b, and c are in angstrom; and α, β, and γ are in degree) | | | | | |
| --- | --- | --- | --- | --- | --- | --- | --- | --- |
|  | (S/cm) | (° C.) | a | b | c | α | β | γ |
| Ex. 1 | $1.6 \times 10^{-3}$ | 150 | 9.0559 | 21.526 | 9.1804 | 90 | 114.203 | 90 |
| Ex. 2 | $1.6 \times 10^{-2}$ | 160 | — | — | — | — | — | — |
| Ex. 3 | $7.6 \times 10^{-3}$ | 140 | — | — | — | — | — | — |
| Ex. 4 | $2.0 \times 10^{-2}$ | 200 | — | — | — | — | — | — |
| Ex. 5 | $6.8 \times 10^{-3}$ | 200 | — | — | — | — | — | — |
| Ex. 6 | $7.1 \times 10^{-4}$ | 180 | — | — | — | — | — | — |
| Ex. 7 | $2.2 \times 10^{-2}$ | 200 | — | — | — | — | — | — |
| Ex. 8 | $3.7 \times 10^{-3}$ | 160 | — | — | — | — | — | — |
| Ex. 9 | $1.8 \times 10^{-2}$ | 180 | — | — | — | — | — | — |
| Ex. 10 | $1.2 \times 10^{-4}$ | 150 | 8.4676 | 9.549 | 15.57 | 90 | 90 | 90 |
| Ex. 11 | $3.2 \times 10^{-3}$ | 140 | 7.4768 | 14.377 | 15.145 | 115.82 | 99.384 | 99.565 |
| Ex. 12 | $7.1 \times 10^{-5}$ | 190 | 14.186 | 9.892 | 19.313 | 90 | 97.305 | 90 |
| Ex. 13 | $9.3 \times 10^{-6}$ | 150 | 7.468 | 9.042 | 9.394 | 78.3 | 73.4 | 76.99 |
| Ex. 14 | $7.1 \times 10^{-7}$ | 130 | 8.823 | 27.373 | 10.113 | 90 | 90 | 90 |
| Ex. 15 | $3.5 \times 10^{-6}$ | 100 | 13.8557 | 15.1778 | 16.237 | 102.734 | 115.096 | 95.621 |

TABLE 1-continued

|  | Ionic conductivity (S/cm) | Measurement temperature (°C.) | Lattice parameter (a, b, and c are in angstrom; and α, β, and γ are in degree) | | | | | |
|---|---|---|---|---|---|---|---|---|
|  |  |  | a | b | c | α | β | γ |
| Ex. 16 | $5.3 \times 10^{-7}$ | 90 | 8.569 | 8.784 | 17.994 | 90 | 103.482 | 90 |
| Ex. 17 | $2.8 \times 10^{-4}$ | 190 | 9.777 | 10.64 | 15.384 | 90 | 90 | 90 |

TABLE 2

|  | Metal species | Molecule capable of undergoing protonation or deprotonation | Molar ratio of (metal):(phosphoric acid):(molecule capable of undergoing protonation or deprotonation) |
|---|---|---|---|
| Ex. 1 | Zn | Imidazole | 1:3:2 |
| Ex. 2 | Zn | Imidazole | 1:2.5:2 |
| Ex. 3 | Zn | Imidazole | 1:3.5:2 |
| Ex. 4 | Zn | Imidazole | 1:3:3 |
| Ex. 5 | Zn | Benzimidazole | 1:3:2 |
| Ex. 6 | Zn | 1,2,4-Triazole | 1:3:2 |
| Ex. 7 | Ga | Imidazole | 1:3:2 |
| Ex. 8 | Co | Imidazole | 1:3:2 |
| Ex. 9 | Cu | Imidazole | 1:3:2 |
| Ex. 10 | Zn | 1,2,4-Triazole | 1:2:2 |
| Ex. 11 | Zn | Benzimidazole | 3:6:1 |
| Ex. 12 | Zn | 5,6-Dimethylbenzimidazole | 1:3:2 |
| Ex. 13 | Zn | 2-Ethylimidazole | 1:2:1 |
| Ex. 14 | Zn | Benzimidazole | 1:2:1 |
| Ex. 15 | Zn | 2-Methylbenzimidazole | 3:6:1 |
| Ex. 16 | Zn | 1,2,3-Triazole | 1:1:1 |
| Ex. 17 | Zn | 1,4-Diazabicyclo[2.2.2]octane | 1:3:1 |

(Advantageous Effects of Proton Conductors of Examples 1 to 17)

(1) The proton conductors of Examples 1 to 17 exhibit satisfactory ionic conductivity even at high temperatures. The proton conductors, when employed as electrolytes, can give fuel cells that are usable even at high ambient temperatures (e.g., 100° C. or higher). This allows the fuel cells to be operated at high temperatures so as to suppress poisoning of electrode catalysts. Such high operation temperatures also allows the fuel cells to have better exhaust heat efficiency.

(2) The proton conductors of Examples 1 to 17 perform ionic conduction without the medium of water. The proton conductors, when employed as electrolytes, can give fuel cells that are usable under conditions with no or little humidification. The fuel cells do not require a system for controlling the water content in the electrolytes.

(3) The proton conductors of Examples 1 to 17 are in solid state. The proton conductors, when employed as electrolytes, can give fuel cells that are resistant to disadvantages. The disadvantages are such that the liquid leaches out, and the leached liquid reacts with a component in the electrode to impair the fuel cell and to induce a mixed potential to thereby reduce the output of the fuel cell.

EXAMPLE 18

Materials were weighed which were 420 mg of zinc oxide, 1.06 mL of a 85% phosphoric acid aqueous solution, 140 mg of imidazole, and 255 mg of titanium oxide powder as an additive. The materials were stirred and mixed in an agate mortar at room temperature in the atmosphere for 15 minutes. The mixture was dried at 80° C. for 15 hours and yielded a white powder (proton conductor containing 10 percent by weight of $TiO_2$).

EXAMPLES 19 to 34

Proton conductors each containing an additive were prepared basically by the procedure of Example 18, except for changing at least one of the type, particle size, and amount of additive. Table 3 indicates compositions of the proton conductors of Examples 19 to 34.

TABLE 3

|  | Type of additive | Amount (weight percent) | Particle size (nm) | pH |
|---|---|---|---|---|
| Ex. 18 | $TiO_2$ powder | 10 | 20 | — |
| Ex. 19 | $SiO_2$ powder | 10 | 20 to 50 | — |
| Ex. 20 | $Al_2O_3$ powder | 10 | 20 to 50 | — |
| Ex. 21 | $TiO_2$ powder | 10 | 400 | — |
| Ex. 22 | $TiO_2$ powder | 10 | 8 | — |
| Ex. 23 | $TiO_2$ powder | 20 | 20 | — |
| Ex. 24 | $TiO_2$ powder | 5 | 20 | — |
| Ex. 25 | PEG | 10 | — | 4 |
| Ex. 26 | PAA | 10 | — | 3 |
| Ex. 27 | PVPA | 10 | — | <1.5 |
| Ex. 28 | PSSA | 10 | — | <1 |
| Ex. 29 | DNA | 10 | — | 2.5 |
| Ex. 30 | Cs | 1 | — | — |
| Ex. 31 | Rb | 1 | — | — |
| Ex. 32 | K | 1 | — | — |
| Ex. 33 | Na | 1 | — | — |
| Ex. 34 | Li | 1 | — | — |

The polyethylene glycol and poly(acrylic acid) used in Examples 25 and 26 had molecular weights of 100000 and 25000, respectively. The DNA used in Example 29 had 500 to 1000 base pairs.

Terms relating to additives in Table 3 refer to as follows. The term "Amount (weight percent)" refers to the amount (weight percent) of the additive relative to the total weight of the metal ion, oxoanion, and molecule capable of undergoing protonation or deprotonation. The term "Particle size (nm)" refers to the particle size of a metal oxide. The term "pH" refers to the pH of an organic polymer.

REFERENTIAL EXAMPLE

A proton conductor having the same composition as with Example 18 was prepared by the above procedure, except for adding the additive after the mixing of other materials. Specifically, 420 mg of zinc oxide, 1.06 mL of a 85% phosphoric acid aqueous solution, and 140 mg of imidazole were weighed. The materials were stirred and mixed in an agate mortar at room temperature in the atmosphere for 15 minutes. The mixture was dried at 80° C. for 15 hours and yielded a white powder. The white powder was combined with 255 mg of titanium oxide powder as an additive and yielded a proton conductor of Referential Example.

Using the proton conductors of Examples 18 to 34 and Referential Example, single cells were prepared and their ionic conductivities were measured by the procedure of Example 1. The measured data are indicated in: FIG. 8 for Examples 1 and 18 and Referential Example; FIG. 9 for Examples 1 and 18 to 20; FIG. 10 for Examples 1, 18, 21, and 22; FIG. 11 for Examples 1, 18, 23, and 24; FIG. 12 for Examples 1 and 25 to 29; and FIG. 13 for Examples 1 and 30 to 34.

In FIG. 8, "COMPLEX (SIMUL)" and "COMPLEX (SIMPLE)" refer to Example 18 and Referential Example, respectively.

In FIG. 9, the terms "$TiO_2$", "$SiO_2$", and "$Al_2O_3$" refer to Examples 18, 19, and 20, respectively.

In FIG. 10, the terms "20 nm", "400 nm", and "8 nm" refer to Examples 18, 21, and 22, respectively.

In FIG. 11, the terms "10 wt %", "20 wt %", and "5 wt %" refer to Examples 18, 23, and 24, respectively.

In FIG. 12, the terms "PSSA", "PVPA", "PAA", "DNA", and "PEG" refer to Examples 28, 27, 26, 29, and 25, respectively.

In FIG. 13, the terms "Cs", "Rb", "K", "Na", and "Li" refer to Examples 30, 31, 32, 33, and 34, respectively.

The measured data in FIGS. 8 to 13 clearly demonstrate that the additives, when added, helped the proton conductors to have further higher ionic conductivity at a high temperature (e.g., 100° C. or higher).

The proton conductor of Example 18 had further higher ionic conductivity at a high temperature (e.g., 100° C. or higher) than that of the proton conductor of Referential Example.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A proton conductor comprising:
    a coordination polymer that is provided as a crystal structure having defined lattice parameters, the crystal structure having stoichiometrically:
        a plurality of metal ions;
        a plurality of oxoanions; and
        a plurality of molecules capable of undergoing protonation or deprotonation,
        the coordination polymer including a plurality of coordination entities that are repeatedly coordinated to bond the coordination entities with one another,
    wherein each coordination entity of the plurality of coordination entities is either a first coordinate entity or a second coordination entity,
    the first coordination entity being one metal ion of the plurality of metal ions coordinated with either (i) at least one oxoanion of the plurality of oxoanions or (ii) at least one molecule capable of undergoing protonation or deprotonation of the plurality of molecules capable of undergoing protonation ro deprotonation, and
    the second coordination entity being the metal ion coordinated with each of (i) at least one oxoanion of the plurality of oxoanions and (ii) at least one molecule capable of undergoing protonation or deprotonation of the plurality of molecules capable of undergoing protonation or deprotonation.

2. The proton conductor according to claim 1, wherein the plurality of oxoanions are monomers.

3. The proton conductor according to claim 1, wherein the plurality of oxoanions are at least one selected from the group consisting of phosphate ion, hydrogenphosphate ion, and dihydrogenphosphate ion.

4. The proton conductor according to claim 1, wherein the plurality of molecules capable of undergoing protonation or deprotonation are at least one selected from the group consisting of imidazole, triazole, benzimidazole, benzotriazole, and derivatives of them.

5. The proton conductor according to claim 1, wherein the plurality of molecules capable of undergoing protonation or deprotonation are at least one selected from the group consisting of primary amine represented by General Formula R—$NH_2$; secondary amine represented by General Formula $R^1$ ($R^2$)—NH; tertiary amine represented by General Formula $R^1$ ($R^2$)($R^3$)—N; linearly-catenated carbon diamine; saturated cyclic amine; and saturated cyclic diamine,
    wherein R, $R^1$, $R^2$, and $R^3$ are each independently any of alkyl group, aryl group, alicyclic hydrocarbon group, and heterocyclic group.

6. The proton conductor according to claim 1, wherein the plurality of metal ions are at least one selected from the group consisting of cobalt ion, copper ion, zinc ion, and gallium ion.

7. The proton conductor according to claim 1, further comprising:
    an additive that is at least one selected from the group consisting of a metal oxide, an organic polymer, and an alkali metal ion.

8. The proton conductor according to claim 7, wherein the metal oxide is at least one selected from the group consisting of $SiO_2$, $TiO_2$, $Al_2O_3$, $WO_3$, $MoO_3$, $ZrO_2$, and $V_2O_5$.

9. The proton conductor according to claim 7, wherein the organic polymer includes an acidic functional group.

10. The proton conductor according to claim 9, wherein the acidic functional group is any one of carboxyl group, sulfonic acid group, and phosphonic acid group.

11. The proton conductor according to claim 7, wherein the alkali metal ion is at least one metal ion selected from the group consisting of Li, Na, K, Rb, and Cs ions.

12. A method for manufacturing the proton conductor according to claim 1, wherein the plurality of metal ions, the plurality of oxoanions, and the plurality of molecules capable of undergoing protonation or deprotonation are mixed at a temperature of 200° C. or lower.

13. A method for manufacturing the proton conductor according to claim 7,
    wherein the plurality of metal ions, the plurality of oxoanions, and the plurality of molecules capable of undergoing protonation or deprotonation, and the additive are mixed at a temperature of 200° C. or lower.

14. A fuel cell comprising an electrolyte including the proton conductor according to claim 1.

* * * * *